J. A. TRAUT & H. RICHARDS.
BENCH-PLANE.
No. 7,565. Reissued March 20, 1877.
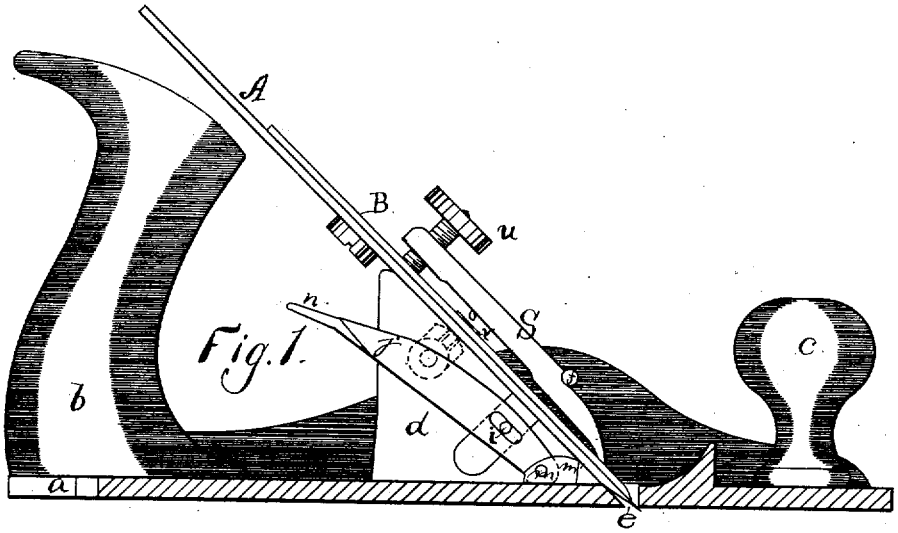
Fig. 2.
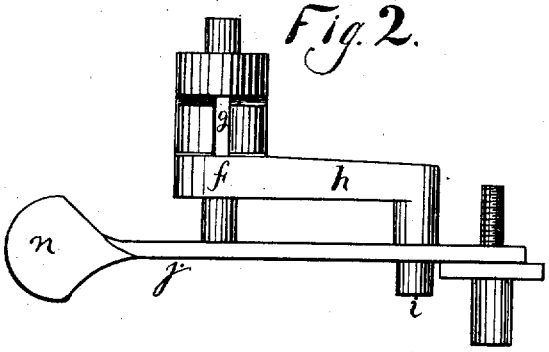
Fig 4.
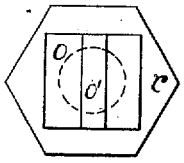
Fig. 5
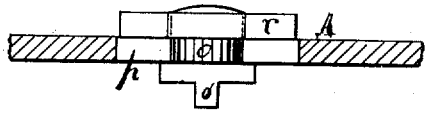
Fig. 3.
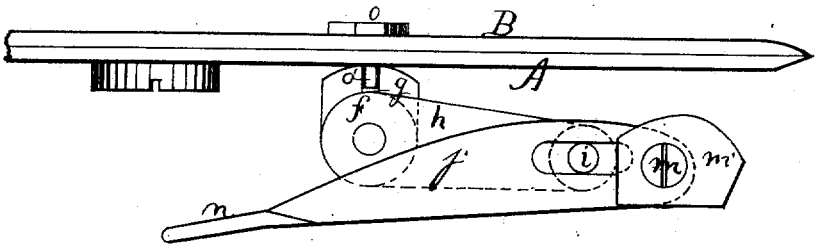
Witnesses
H. L. Gale
Geo. F. Gordy
Inventors.
Justus A. Traut.
Henry Richards.
By James Shepard
Atty.
N. PETERS, PHOTO-LITHOGRAPHER, WASHINGTON, D. C.

UNITED STATES PATENT OFFICE.

JUSTUS A. TRAUT AND HENRY RICHARDS, OF NEW BRITAIN, CONNECTICUT.

IMPROVEMENT IN BENCH-PLANES.

Specification forming part of Letters Patent No. 176,152, dated April 18, 1876; reissue No. 7,565, dated March 20, 1877; application filed June 28, 1876.

*To all whom it may concern:*

Be it known that we, JUSTUS A. TRAUT and HENRY RICHARDS, both of New Britain, in the county of Hartford and State of Connecticut, have invented certain new and useful Improvements in Bench Planes; and, to enable others skilled in the art to make and use the same, we will proceed to describe it, referring to the drawings, in which the same letters indicate like parts in each of the figures.

The invention relates to devices for holding and adjusting the cutting-iron, and consists, first, in the combination of compound levers with a plane stock and iron; and, second, in the combination of parts whereby the adjustable stud may be secured to and adjusted within the cutting-iron or cap-iron, and applied to either a single or double iron; and third, in the combination of parts forming the complete device.

In the accompanying drawing, Figure 1 is a side view of a plane which embodies my invention, and has one side portion of the stock removed to show the inclined brackets upon which the cutting-iron is held, and the compound levers for adjusting the iron. Fig. 2 is a top view of the compound levers detached from the stock. Fig. 3 is a side view of the same. Fig. 4 is an enlarged view of the adjustable stud; and Fig. 5 is a side view of the same, together with a portion of the cutting-iron A.

The object of the invention is to cheapen the manufacture and produce a simple, sure, and effective mode of adjusting and holding the irons in the desired position.

*a* designates the stock; *b*, the handle; *c*, the knob for steadying the plane, and S the fastening-pad, which bears upon the lower end and face of the cap-iron B, and takes bearings on its upper side against the pins *t*, and is provided with a thumb-screw, *u*, by means of which the irons are held firmly in place against any accidental displacement. This fastening-pad and all above described are now in common use. *d* represents inclined brackets arranged a short distance apart each way from the middle of the stock, and in diverging lines back from the mouth *e* of the plane, and forming bearings for the cutting-iron.

*f* designates a rocking spindle having a groove, *g*, and a lever, *h*. This rocking spindle with its lever *h* is secured by fulcrum-bearings between and near the upper end of the brackets *d*, while the wrist-pin *i* in the lower end of the lever *h* vibrates in an opening in one of the brackets *d*.

*j* designates a thumb-lever, which is secured near the lower end of one of the brackets *d* by a screw, *m*, and with or without a friction-collar, *m'*. The pin *i* of the lever *h* is received and works in a slot made in the lower end of lever *j*, (see Figs. 1 and 3,) so that by raising or depressing said lever by a thumb-pad, *n*, the required vibration or rotation of the rocking spindle will be produced to cause the movement of the iron A up or down, to properly adjust it for planing, the friction of the parts, with the aid of the fastening-pad, being sufficient to hold the cutter in the position to which it may be adjusted. The levers *j* and *h* and rocking spindle *f g* together constitute compound levers, and they are so arranged within the stock that the lever *j* may have a long sweep to give the required adjustment of the iron, whereby a very easy and delicate adjustment is effected. To this end it is essential that the short arm of the lever through which the power is applied shall engage with the long arm of the lever which communicates the power to the plane-iron.

*o* designates an adjustable stud, having a tooth or projection, *o'*, which corresponds to the groove *g* in the rocking-spindle *f*, and is set to engage therewith. This stud *o* is secured to the cutting-iron A, either directly, as shown in Fig. 5, or through the medium of the cap-iron B, as shown in Fig. 3, and is adjustable longitudinally within the member to which it is attached, whether that part be the cutting-iron or the cap-iron, the following constituting the means of adjustment: viz, a portion of the body of said stud is reduced so as to form shoulders upon its lower end, and its upper end is threaded and provided with a nut, *r*. The body of this stud passes through a longitudinal slot, *p*, formed in the body of the cutting-iron or cap-iron, and is so fitted thereto that, when the nut is loosened, the stud may be moved lengthwise in said slot to any desired position, and then secured rigidly by tightening up the nut.

The object of the adjustable stud when secured to the cap-iron is to enable it to be moved a short distance up in case the cap wears away or has to be ground off, which distance may be just equal to the reduction of the cap, so as to make the stud properly engage with the adjusting-lever, herein termed the rocking spindle, and when secured to the cutting-iron that it may be fixed higher up in the iron as it wears off by grinding or otherwise. Inasmuch as the cutting-iron wears away faster than the cap-iron the necessity of making the stud adjustable is far greater when it is applied to the cutting-iron than it is when applied to the cap-iron. When this stud is used in a double iron and secured to the cap the iron should be properly slotted, so as not to interfere with the stud *o*.

It should also be noticed that when the stud is applied to the cutting-iron, as shown in Fig. 5, it is wholly independent of the cap-iron, and even if a cap-iron were used in connection with the cutting-iron to which the stud is attached it would have no connection with the stud, and would form no part of the means of fastening it in place or of adjusting it in the cutting-iron, and that when the stud is fastened to the cap-iron, as shown in Fig. 3, the cutting-iron has no direct connection therewith, and forms no part of the means of fastening it, or of adjusting it in the cap-iron. The peculiar construction which gives this independence enables the stud to be secured to, and adjusted within, either the cutting-iron or cap-iron, and applied to either a single or double iron.

Thus it will be seen that by the employment of the stud the point of engagement between the iron and its actuating mechanism may be kept uniformly at the same distance from the cutting-edge of the cutter or lower end of the cap during all the various lengths they may undergo by use.

By means of the compound levers *h j* a very cheap, effective, and nice adjustment of the plane-iron is produced.

We are aware of the patent to Elliot G. Storke, No. 162,710, dated April 27, 1875, and we hereby disclaim the devices therein shown.

We claim as our invention—

1. The combination of the compound levers *f*, *h*, and *j* with a plane iron and stock, substantially as described, and for the purpose specified.

2. The iron A, provided with slot *p*, in combination with the shouldered stud *o* and the fastening-nut *r*, substantially as described, and for the purpose set forth.

3. The combination of the inclined brackets *d*, levers *f*, *h*, and *j*, adjustable stud *o*, and plane-iron A, all substantially as described, and for the purpose set forth.

JUSTUS A. TRAUT.
HENRY RICHARDS.

Witnesses:
JAMES SHEPARD,
T. A. CONKLIN.